Patented Sept. 10, 1946

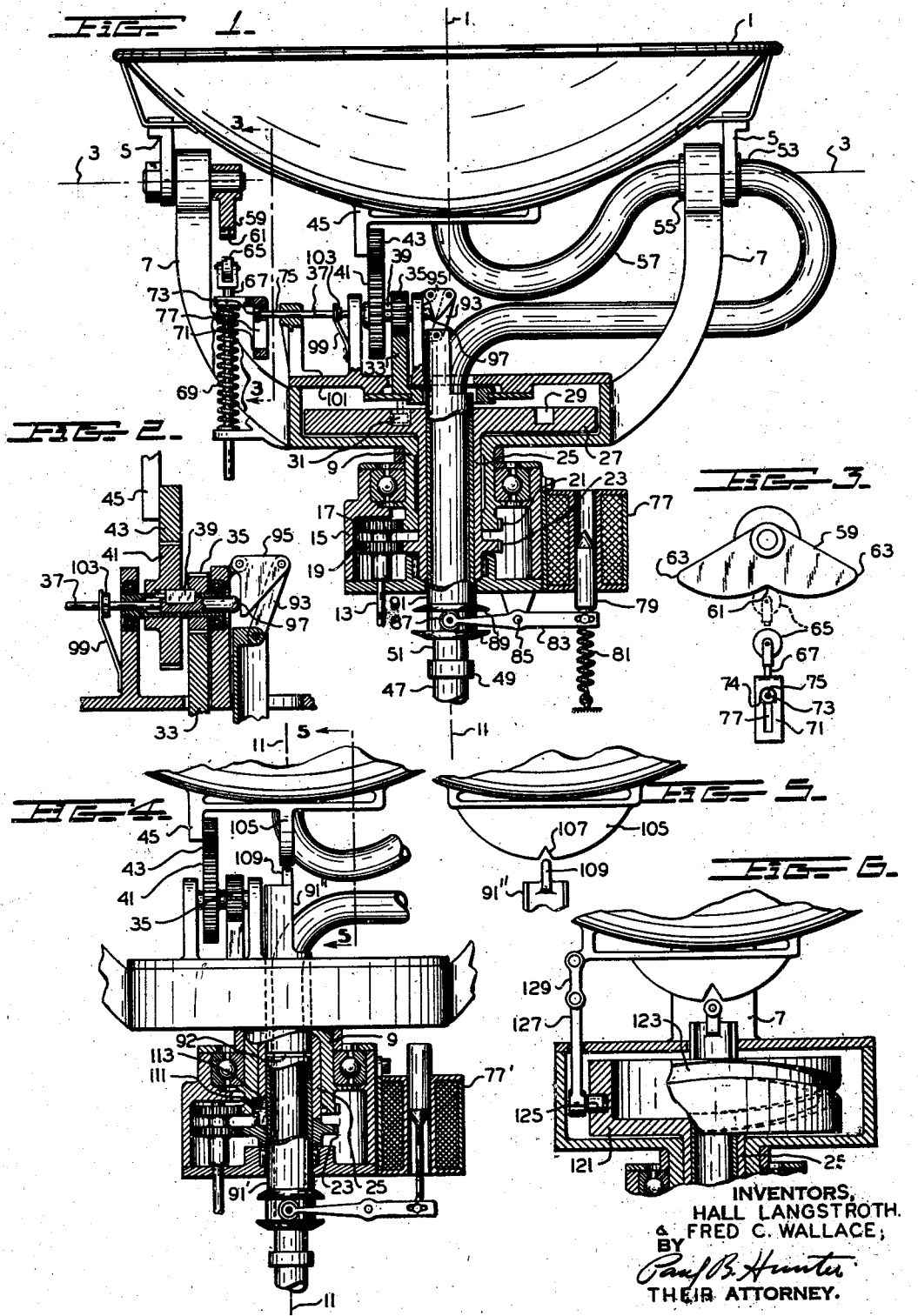

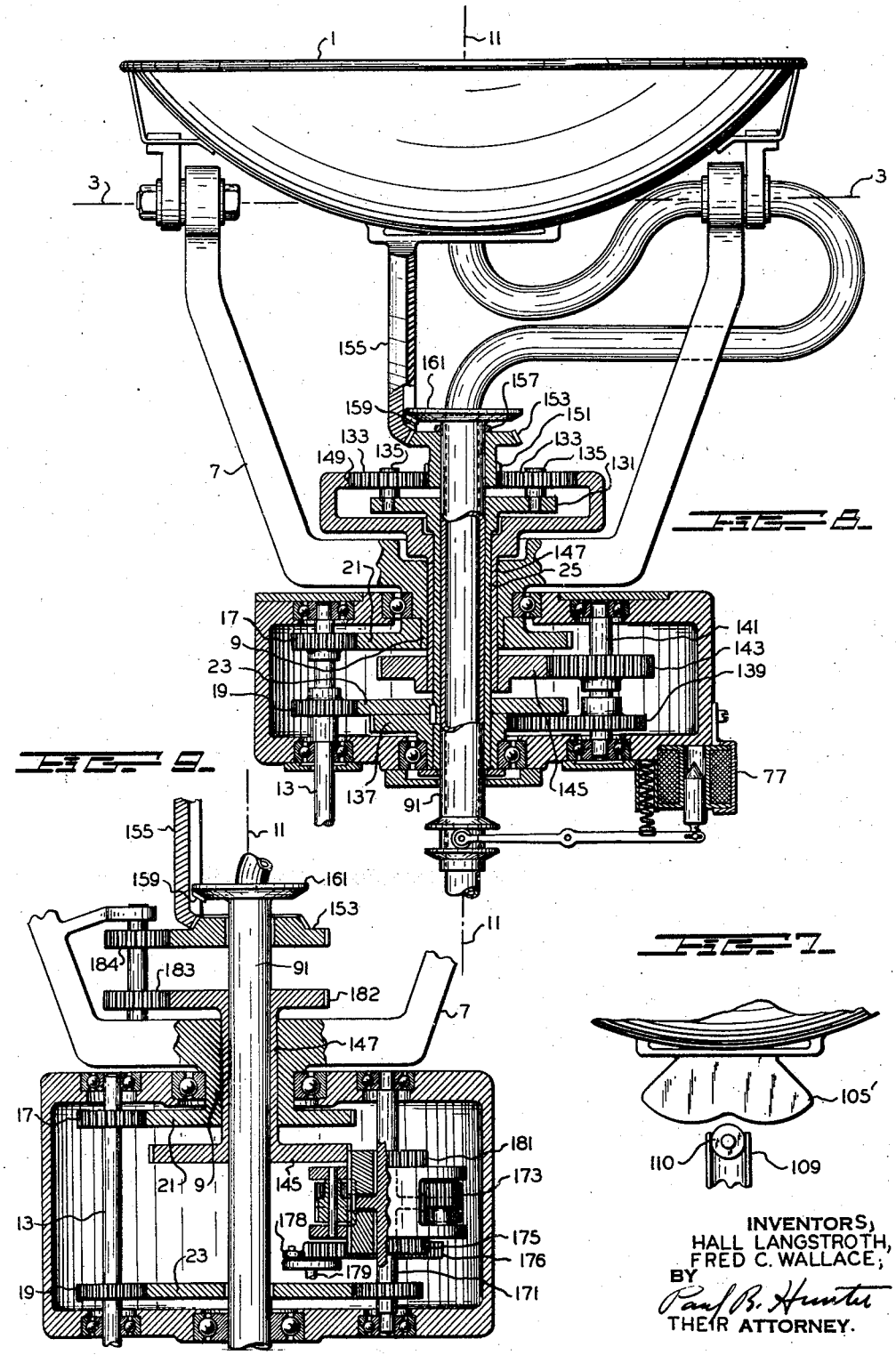

2,407,305

UNITED STATES PATENT OFFICE 2,407,305

SCANNING DEVICE

Hall Langstroth, Hempstead, and Fred C. Wallace, Flushing, N. Y., assignors to Sperry Gyroscope Company, Inc., Brooklyn, N. Y., a corporation of New York Application April 10, 1942, Serial No. 438,398

9 Claims. (Cl. 250—11)

The present invention relates to scanning devices for scanning highly directive radiant energy radiation or receptivity patterns over a predetermined conical solid angle.

In many types of devices, such as object detectors, it is necessary to project or receive a sharply directional radiant energy radiation or receptivity pattern and to scan this pattern over a definite portion of a sphere, especially for the purpose of obtaining radiant energy reflections from any object which may be in the field of this radiation and for using such reflected radiation to indicate the presence and/or position of the reflecting object. It is also desirable to interrupt this scanning motion when an object has been detected and to produce a conical motion having a very small apex angle, such as of the order of four degrees, for the purpose of giving a finer and more accurate indication of the position of the reflecting object.

In the present invention a beam of radiant energy, such as a high frequency radio beam, is projected from a suitable highly directional radiator which is caused to oscillate slowly or "nod" about an axis substantially perpendicular to the direction of the beam. At the same time, this "nod" axis itself is rotated at a fairly high speed about a "spin" axis normal to the "nod" axis so that the beam in effect sweeps out a spiral pattern caused by the widening of the circles produced by the fast spin motion in response to the slow nod motion. Accordingly, the present device is enabled to scan in a spiral fashion a substantially conical portion of the sphere whose extent is determined by the angular limits of the nod oscillation. In addition, means are provided for substantially instantly changing this spiral scanning motion of the beam into a small conical scan by interrupting the nod motion near its zero position and retaining only the spinning motion. The apex angle of this conical scanning is obtained by off-setting the orientation of the beam from the axis of spin.

Accordingly, it is an object of the present invention to provide an improved apparatus for scanning a predetermined portion of the sphere by a directional radiation or receptivity pattern.

It is another object of the present invention to provide improved devices for scanning a highly directional radiation or receptivity pattern in a spiral.

It is still another object of the present invention to provide improved devices for effecting spiral scanning and for converting such spiral scanning into fixed conical scanning.

Further objects and advantages of the present invention will be apparent from the following specification and drawings.

Fig. 1 shows an elevation view partly in section of one embodiment of the present invention.

Fig. 2 shows an enlarged detailed vertical section view of a portion of Fig. 1.

Fig. 3 is a section view of the device of Fig. 1 taken along the line 3—3 thereof.

Fig. 4 is a view similar to Fig. 1 showing a modification of a portion of the device of Fig. 1.

Fig. 5 shows a detail side elevation of Fig. 4 viewed along the line 5—5.

Fig. 6 is an elevation view partly in section showing a modified construction for the device of Figs. 1 and 4.

Fig. 7 is a view similar to Fig. 5 showing a modified construction suitable for use in Figs. 4, 5, or 6.

Fig. 8 is an elevation view partly in section showing a further modification of the invention.

Fig. 9 is a detail view similar to Fig. 8 showing still another modification.

Referring to Fig. 1 a suitable directional radiating or receiving arrangement for radiant energy, such as a metallic reflector 1 preferably of paraboloidal form and containing a suitable antenna arrangement, is supported for rotation about an axis 3 as by means of suitable brackets 5 fixed to reflector 1 and pivotally mounted in a yoke 7, which is integrally formed with or fastened to a sleeve 9 whose axis 11 is perpendicular to axis 3. Axis 3 is termed the "nod" axis, and axis 11 the "spin" axis. Any suitable type of motive means, such as an electric motor, is connected to drive an input shaft 13, which has bearings mounted in a fixed casing 15. Fastened to shaft 13 are two gears 17 and 19 which are thereby rotated at a fixed speed. Gear 17 engages a gear 21 fixed to or integrally formed on sleeve 9, and thereby causes the reflector 1 to continuously rotate at a predetermined speed about spin axis 11. Engaging with gear 19, which is also continuously rotated from shaft 13, is a further gear 23 to which is connected a second sleeve 25 mounted rotatably and concentrically within sleeve 9. Fastened to the end of sleeve 25 is a suitable cam 27 formed as a flat disc containing a groove 29 eccentric to spin axis 11 and of a predetermined shape, chosen, as will be described, to provide a suitable type of nod motion for reflector 1.

Engaged in groove 29 of cam 27 is a suitable follower 31. It is to be understood that follower 31 is actually located in a plane passing through spin axis 11 and vertical to the plane of the drawing of Fig. 1, but is shown as in Fig. 1 for purposes of clarity. Cam follower 31 is restricted in its motion to translation only and hence, by the motion of cam 27 relative to yoke 7, is caused to move back and forth in a straight line perpendicular to the plane of the figure.

Fastened to cam follower 31 is a rack 33 which engages with a pinion 35 fixed to a cross shaft 37 as by a key 39. Key 39 and shaft 37 are adapted to move axially with respect to gear 35 but any rotational movement of gear 35 produces a corresponding rotational movement of shaft 37. Also fixed for rotational motion with shaft 37 as by key 39 is a gear 41, which engages a gear sector 43 fixed to reflector 1 by a suitable bracket 45.

As described above, yoke 7 and reflector 1 are continuously spinning about spin axis 11 at a predetermined speed. Cam follower 31 and rack 33 are also thereby spinning at this spin rate. The gear ratio between gears 19 and 23 is chosen to be slightly different from that between gears 17 and 21, whereby cam 27 is driven at a rate slightly different from the rate of rotation of yoke 7 in spin. This difference is the rate of nod, and produces translation of cam follower 31 and rack 33 with respect to yoke 7, and thereby, through gears 35 and 39 and gear sector 43, produces the nodding motion of reflector 1 about nod axis 3. Since the rate of nod is much slower than the rate of spin it will be clear that the axis of symmetry of reflector 1 is caused to sweep out a series of widening or narrowing circles, the circles being generated by spinning about spin axis 11 and the widening or narrowing being caused by nodding about nod axis 3. This in effect produces a spiral scanning of the axis of reflector 1 over a predetermined solid angle.

If the system is to act as a radiator, the radiant energy to be radiated from reflector 1 is introduced through a suitable wave guide 47. In view of the fact that the radiating arrangement is spinning rapidly about spin axis 11 it is necessary to provide a suitable rotating joint 49 for coupling the stationary portion 47 of the wave guide to the rotating portion 51 carried by yoke 7. Suitable types of rotating joint are shown in copending application Serial No. 429,494, for Directive antenna structure, filed February 4, 1942, in the names of R. J. Marshall, W. L. Barrow, and W. W. Mieher. Rotating wave guide 51 is then bent around in arcs of suitable radius to extend coaxial with nod axis 3, as at 53. Here again, since the reflector 1 oscillates about nod axis 3 with respect to mounting yoke 7, a further rotating joint indicated at 55 is provided between the section 53 carried by the yoke and section 57 of the wave guide carried by the reflector 1.

Wave guide 57 terminates within reflector 1 in any suitable well known type of termination, such as shown in copending application Serial No. 429,494. Preferably this termination is so adjusted that the orientation of the maximum directivity of the radiation pattern of reflector 1 is at a slight angle to the axis of spin 11 even in the position of zero nod. This angle is chosen to be the apex angle of the conical scanning to be described below. The angle may be formed by selecting the proper zero nod condition, or by off-setting the antenna within reflector 1.

When conical scanning is desired in the arrangement already set forth it is merely necessary to interrupt the nodding motion and to fix the reflector 1 at a predetermined position in its nod cycle. One method of performing this operation is shown in Figs. 1 to 3.

Mounted on the nod axis 3 and fixed with respect to reflector 1 is a suitably shaped cam or locking piece 59 which has its smallest radius, as at point 61, at the position corresponding to zero nod of reflector 1; that is, at the position where the axis of symmetry of reflector 1 is most nearly coincident with the spin axis 11, differing therefrom only by the apex angle defined above. From this point 61 the radius of cam 59 increases smoothly in both directions to a maximum radius at its tips, as at 63.

Cooperating with cam 59 is a roller detent 65 mounted on a suitable rod 67 which is normally held away from engagement with cam 59 against the force of a spring 69 by means of a latching arrangement comprising a latching member 71 and a projection 73 on the end of shaft 37 serving as a detent. As described above, shaft 37 is axially translatable.

In the position shown in Fig. 1, roller 65 is held away from cam 59. However, upon translating shaft 37 to the left, its enlarged portion or detent 73 will move away from latch 71, permitting the smaller diameter section 75 of shaft 37 to move within a slot 77 of latch 71 and thereby permitting spring 69 to urge roller 65 into engagement with cam 59. Spring 69 is chosen of such strength that if reflector 1 is free to turn roller 65 engaging cam 59 will cause reflector 1 to rotate until roller 65 engages the smallest radius portion 61 of cam 59, and will thereafter hold reflector 1 centralized in this position. Reflector 1 is made free to rotate in response to the action of cam 59 and roller 65 by motion of key 39 out of engagement with gear 35 upon axial motion of shaft 37. When this occurs, gear 35 is left free to rotate upon shaft 37 and can produce no motion of shaft 37, gear 41 and gear sector 43 attached to reflector 1.

Such axial motion of shaft 37 is provided by the energization of a suitable solenoid 77 fastened to the base or housing 15. Upon energization of solenoid 77 its magnetic armature plunger 79 is drawn upward against the tension of a spring 81, thereby rotating arm 83 about a pivot 85 fixed to base 15. The far end of arm 83 carries a roller 87 which normally rolls within a pair of guides 89 formed on a third sleeve 91 located concentrically and slidably within sleeves 25 and 9. Thereby, energization of solenoid 77 will produce a downward motion of sleeve 91, which spins at the same rate as yoke 7.

Pivoted to the upper end of sleeve 91 is a link arrangement 93 which, upon a downward motion of sleeve 91, produces a leftward motion of shaft 37, as by means of an arm 95 engaging the end 97 of shaft 37. Shaft 37 is thereby moved to the left upon energization of solenoid 77, and acts both to disengage the nod driving mechanism of reflector 1 and to disengage latch 71, whereby the centralizing cam and roller arrangement 59—65 is actuated to centralize the reflector 1 and maintain it with its axis of symmetry at a fixed scanning angle with respect to spin axis 11. Thereafter, so long as solenoid 77 is energized, reflector 1 will be rotating only about its spin axis 11, and the directional beam of radiant energy, which as described above, is off-set from the spin axis 11, will generate a cone. Preferably the off-set angle is chosen substantially equal to the angular width of the directional radiation pattern, so that an accurate determination of the orientation of a distant object may be made.

Upon deenergization of solenoid 77, spring 81 causes plunger 79 to withdraw from solenoid 77, thereby moving sleeve 91 upward and releasing arm 95 from the end of shaft 37. A spring 99, having one end fixed to the spinning mount 101 and the other end rotatably engaging a collar 103 fixed to shaft 37, urges shaft 37 toward the right. In so doing, and before detent 73 on shaft 37 can enter its mating opening 74 in latch 71, key 39 once more connects gear 35 to gear sector 43 through gear 41, and starts the reflector nodding about nod axis 3. In so doing cam 59 now drives roller 65 and its rod 67 downward. As rod 67 reaches its lowest position, projection 73 of shaft 37 slips into its mating opening 74 and thereafter holds roller 65 away from engagement from cam 59 and the system resumes its spiral scanning as described above.

As an alternative construction, shaft 37 need not be made to rotate. Thus, gears 35 and 41 may be coupled by key 39, which thereby rotates with respect to shaft 37. Key 39 is adapted to be disengaged from gear 35 by action of a shoulder on shaft 37, when shaft 37 is shifted axially in response to actuation of solenoid 77, as already described.

It will be clear that by the apparatus just described the transition to conical scanning is made with the greatest accuracy, since the position of the reflector 1 during conical scanning is determined directly with respect to yoke 7, avoiding any inaccuracies arising from backlash, etc., which would appear if reflector 1 were held at any other point of its drive.

Suitable counterweights may be provided about both axes 3 and 11 to provide both static and dynamic equilibrium during scanning.

Figs. 4 and 5 show a modified arrangement for converting from spiral scanning to conical scanning. Here cam 59, its roller 65, spring 69, latch 71 and detent 73 on shaft 37 are omitted. In their place a suitable member 105 having a notch 107 is fastened to reflector 1, notch 107 corresponding to the zero nod position of reflector 1 in which its axis of symmetry most nearly coincides with spin axis 11. Formed upon the end of sleeve 91, which is now arranged to be drawn upward upon energization of solenoid 77', is a projection 109 preferably rounded and adapted to cooperate with a preferably V-shaped notch 107 in member 105. Therefore, upon energization of solenoid 77', sleeve 91 moves upward urging projection 109 against member 105. Projection 109 therefore slips into notch 107 when reflector 1 reaches the proper position and serves to hold reflector 1 in this position for conical scanning. At the same time, as projection 109 slips into notch 107, a key 111 which serves to couple gear 23 to sleeve 25 during spiral scanning, is slid upward into a suitable, preferably annular, recess 113 in sleeve 9 and disengages sleeve 25 from gear 23 whereby the motion of cam 27 and hence of the power drive for reflector 1 in nod is removed. Thereafter reflector 1 is maintained centralized and conical scanning is performed. If desired, recess 113 could be a simple notch matched to key 111 when projection 109 falls into notch 107.

Key 111 is shown formed integrally with or fixed to the lower part 91' of sleeve 91, which therefore rotates at the same rate as sleeve 25 and cam 27. Since the upper part 91'' of sleeve 91 must rotate at the same rate as yoke 7, a suitable rotatable joint 92 is inserted between the two parts of sleeve 91.

The system shown in Figs. 4 and 5 has the advantage of greater simplicity over that of Fig. 1, since the use of cam 59 and its follower and the translation shaft 37 is eliminated. However, it has the disadvantage that the system must wait until the reflector 1 has reached its centralized position in its normal course of operation before reflector 1 may be centralized to perform conical scanning, whereas, in the system of Fig. 1, no matter what the position of reflector 1 is at the moment solenoid 77 is energized, the reflector 1 is immediately disengaged from the nod drive and returned to its centralized position.

Fig. 6 shows a modified form of construction which may replace the cam 27 and the nod-actuating apparatus in Figs 1 and 4. Here yoke 7 is actuated by sleeve 9 in the same manner as in Figs. 1 and 4.

Sleeve 25 actuates a cylindrical cam 121, which replaces flat cam 27 in Figs. 1 and 4. Cam 121 is provided with a continuous groove 123 whose disposition on the cylindrical surface of cam 121 is so chosen as to provide a desired type of translational motion for its follower 125. Since cam 121 rotates relative to yoke 7, being driven at a different speed therefrom, follower 125 is translationally oscillated in a direction parallel to spin axis 11. Accordingly, to provide nod motion it is merely necessary to couple cam follower 125 to the reflector 1, as by a suitable arm 127 and a pivotally connected link 129.

The mechanism for interrupting the nod motion to provide conical scanning in Fig. 6 is illustrated as being the same as in Fig. 4.

Fig. 7 shows a modification of a portion of Figs. 4, 5, and 6. Thus, in place of member 105 having a notch 107 and cooperating with projection 109 in sleeve 91 as shown in Figs. 4, 5, and 6, member 105 may be provided in the form of a cam 105' similar in contour to cam 59 shown in Fig. 3, and projection 109 of sleeve 91 may terminate in a suitable roller 110 similar to roller 65 in Fig. 3.

The operation of this modification clearly combines the desirable features of Figs. 1 and 4. Thus the complicated latch and detent mechanism of Fig. 1 is eliminated, while retaining the advantage of returning the parabola 1 to its zero nod position substantially instantaneously.

Fig. 8 shows a further modification of the invention including a modified type of nod-producing and nod-interrupting mechanism. Thus, driving shaft 13 rotates gear 19 which engages a further gear 23 connected as by a suitable pin or key to sleeve 25. Sleeve 25, however, instead of rotating a cam as in Figs. 1, 4, and 6, rotates a carrier member 131 carrying floating pinions 133 illustrated in the figure as being two in number, but which may comprise any desired number. The pivots 135 of pinions 133 are mounted equidistant from and parallel to the axis of rotation of carrier 131, which is chosen as spin axis 11. At the same time, gear 23 rotates a gear 137 suitably fixed thereto. Gear 137 is illustrated as being an elliptical gear of the well known type and engages with a second elliptical gear 139.

As is well known, two elliptical gears pivoted at respective focal points spaced the proper distance apart will continuously mesh with one another and one will provide a varying speed output when the other is driven at a constant speed, which output speed oscillates between two limits respectively above and below the driving speed.

Accordingly, the output speed of shaft 141 carrying elliptical gear 139 will be alternately slower and faster than the speed of shaft 25 and carrier 131. Also attached to shaft 141 is a pinion 143 engaging a further gear 145 fixed to a sleeve 147 at whose upper end is mounted an internal gear 149 meshing with pinions 133.

Floatingly mounted and concentric with sleeves 25 and 147 is a spur gear 151 engaging pinions 133. It will be clear that internal gear 149, carrier 131 and its pinions 133, and gear 151, provide one well known type of differential gear and accordingly, the rotation of gear 151 will be proportional to the difference in speeds of internal gear 141 and carrier 131.

As stated above, carrier 131 is rotated at constant speed while internal gear 149 is rotated at a continually varying speed. As a result, the output gear 151 will also be rotated at a continually varying speed which oscillates between two fixed limits. The various gear ratios are so chosen that the average speed of gear 151 will be the same as the speed of yoke 7, which is driven from shaft 13 by way of gear 17, gear 21, and sleeve 9, as in the other figures. In this way gear 151 alternately speeds up and slows down with respect to yoke 7 and accordingly, it periodically reverses its direction of rotation with respect to yoke 7.

Fastened to gear 151 is a beveled gear 153 which engages with a beveled gear sector 155 suitably fastened to the parabola 1. In this way, parabola 1 is oscillated back and forth as the yoke 7 rotates, and there is thus produced the required nod motion and spin motion. It is to be understood that the values of the gear ratios are chosen to provide a suitable rate of non-oscillation.

To provide a nod interruption, sleeve 91 is again provided controlled in a manner similar to that of Fig. 1 by a solenoid 77. The upper end of sleeve 91 carries a projecting collar 157 so that upon energization of solenoid 77 sleeve 91 moves downward and disengages gear 153 from gear sector 155, thereby interrupting the power drive for the nod motion.

At the same time, a projection 159 on a flange 161 fastened to the end of sleeve 91 bears down on beveled sector 155 and is adapted to fall into a notch in sector 155 when the proper orientation of parabola 1 is obtained. These members are so arranged that the nod drive continues until projection 159 falls into its corresponding notch in sector 155, thereby simultaneously interrupting the power drive and stopping nod. In this way, parabola 1 is locked into the proper position for conical scanning, as discussed above.

If desired, a suitable cam and roller arrangement similar to those of Fig. 3 or Fig. 7 may be provided to centralize the parabola 1 instantaneously upon energization of solenoid 77 and interruption of the nod power drive.

Fig. 9 shows a further modification similar in many respects to that of Fig. 8. Thus, drive shaft 13 spins yoke 7 by means of gear 17, gear 21, and sleeve 9. Gear 19, also driven from drive shaft 13, actuates a gear 23 floatingly mounted about axis 11 which thereby drives one member 171 of a suitable differential gear 173 of any well known type. A second member 175 of differential 173 is adapted to be oscillated as by means of a rack 176 engaging therewith and oscillated as by means of a crank drive arrangement 178 whose actuating shaft 179 is suitably driven.

As a result, the third member 181 of differential 173 is driven at a varying speed due to the combined rates of motion of constantly driven member 171 and oscillated member 175. Output member 181 of differential 173 is coupled to a suitable gear 145 fixed to a sleeve 147 and thereby actuates a further gear 182 also fixed to sleeve 147. Gear 182 operates through a suitable train of gears 183 and 184 to actuate member 153 which is similar in function to member 153 shown in Fig. 8.

Member 153 carries bevel gear teeth which engage with bevel gear sector 155 fixed to the parabola 1 as in Fig. 8. The gear ratios involved are so selected that bevel gear 153, which is driven at a varying rate of speed, has an average speed equal to that of spinning yoke 7. Accordingly, with respect to yoke 7, gear 153 alternately speeds up and slows down, and therefore reverses its direction of motion. In this manner the nod oscillation is produced.

The conversion from spiral scanning to conical scanning may be produced in any of the manners described with respect to the previous figures. Thus, if desired, a member 161 carrying a projection 159, similar to the arrangement of Fig. 8 may be provided to halt the nod motion at a particular point of the nod cycle as discussed with respect to Fig. 8. At the same time, the nod drive may be interrupted either in the manner shown in Fig. 8, or by an immobilizing member 175 of differential 173. This may be done in any suitable manner, as by disengaging rack 176 from gear 177, or by declutching the drive shaft 179 of this oscillating motion from its source of power.

Alternatively, gear 153 may be simultaneously disengaged from bevel gear 155, as by the reciprocation of member 161 and sleeve 91 fixed thereto. It will be clear that many other devices for producing this result may be readily evolved from the above description.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A scanning device comprising a directive antenna mounted for rotation and oscillation about independent axes, drive means, means driven by said drive means for rotating said antenna including a first sleeve mounted to rotate about its longitudinal axis, means driven by said drive means for oscillating said antenna including a second sleeve concentric with said first sleeve and rotatably movable with respect thereto, normally ineffective means for holding said antenna in a fixed position with reference to its axis of oscillation including a third sleeve concentric with said first and second sleeves and reciprocatively movable with respect thereto, means for disabling said oscillating means, means for rendering said holding means effective, and means for effecting simultaneous operation of both said disabling and rendering means.

2. A scanning device as claimed in claim 1, in which the reciprocatively movable part of said holding means is a detent and the part that cooperates with the same is a locking piece mounted to move with movement of the antenna about its axis of oscillation.

3. A scanning device as claimed in claim 1, in which said holding means is a detent and the part that cooperates with the same is a locking piece mounted directly on the antenna in a position to move with movement of the same about its axis of oscillation.

4. A scanning device as claimed in claim 1, in which the axis of rotation of the antenna is vertical and the axis of oscillation of the antenna is horizontal.

5. A scanning device as claimed in claim 1, in which said oscillating means includes a rotating cam plate having a translatably mounted follower therefor.

6. A scanning device comprising a directive antenna mounted for rotation and oscillation about independent axes, a differential having two input elements and a single output element, means for driving one of the input elements at a constant speed, means for driving the other input element of the differential at a variable speed, and means for controlling the motion of the antenna about its axis of oscillation from the output element of the differential.

7. A scanning device comprising a directive antenna mounted for rotation and oscillation about independent axes, a differential having two input elements and a single output element, means for driving one of the input elements at a constant speed, means for driving the other input element of the differential at a variable speed, disengageable means for controlling the motion of the antenna about its axis of oscillation from the output element of the differential, normally ineffective means for interrupting motion of the antenna about its axis of oscillation, and means for simultaneously rendering said interrupting means effective and disengaging said disengageable means.

8. A scanning device comprising a directive antenna mounted to spin about one axis and nod about another axis, mechanism operable to spin said antenna including a first sleeve, mechanism operable to nod said antenna including a second sleeve concentric to said first sleeve, and mechanism operable to interrupt the nodding motion of said antenna including a third sleeve concentric to said first and second sleeves.

9. A scanning device of the character claimed in claim 8, in which said nodding mechanism includes a rotating cam plate and a reciprocating cam follower.

HALL LANGSTROTH.
FRED C. WALLACE.